No. 814,059. PATENTED MAR. 6, 1906.
H. S. LONG.
DUMPING CART.
APPLICATION FILED MAY 29, 1905.
2 SHEETS—SHEET 1.
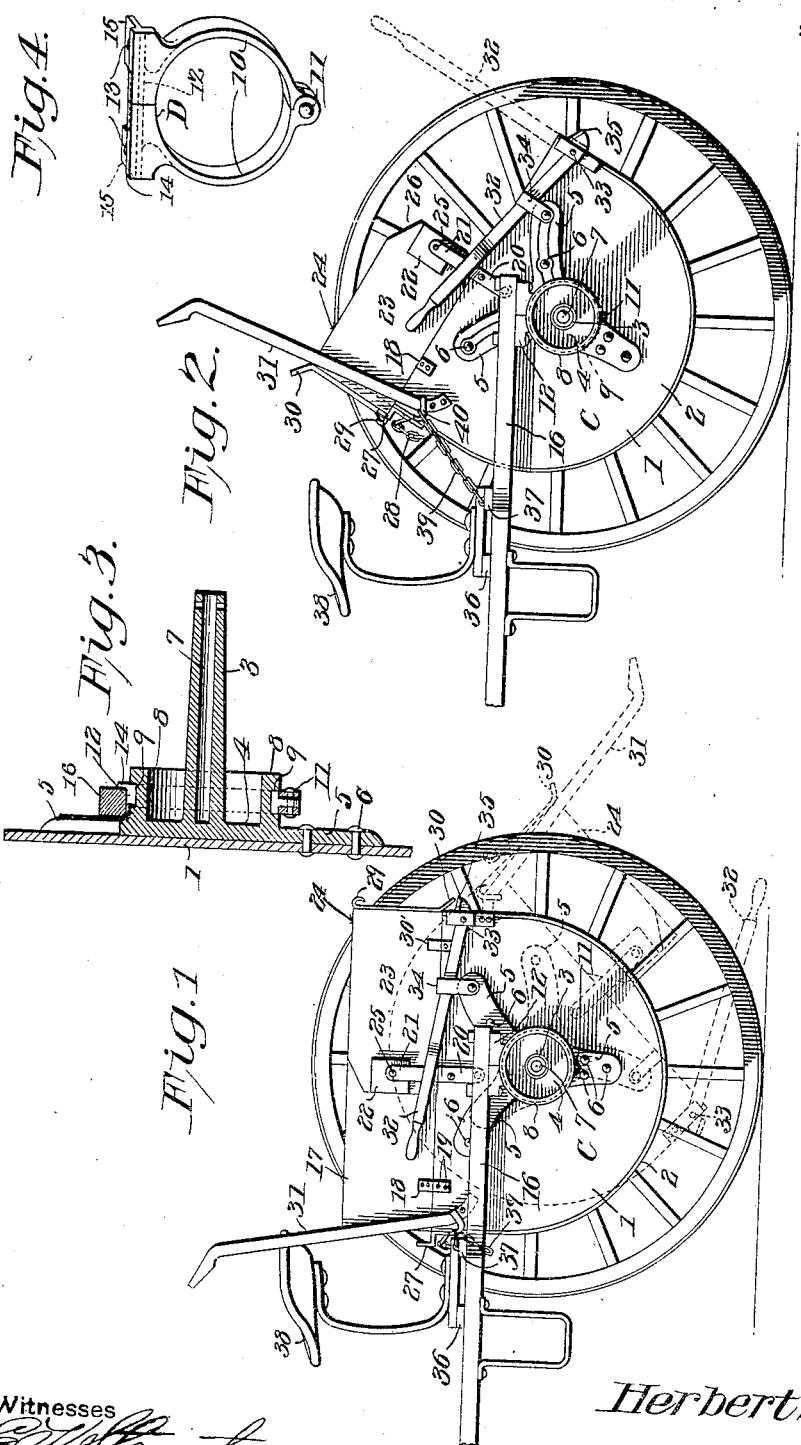
Witnesses
Herbert S. Long, Inventor
by C. A. Snow & Co.
Attorneys No. 814,059. PATENTED MAR. 6, 1906.
H. S. LONG.
DUMPING CART.
APPLICATION FILED MAY 29, 1905.
2 SHEETS—SHEET 2.
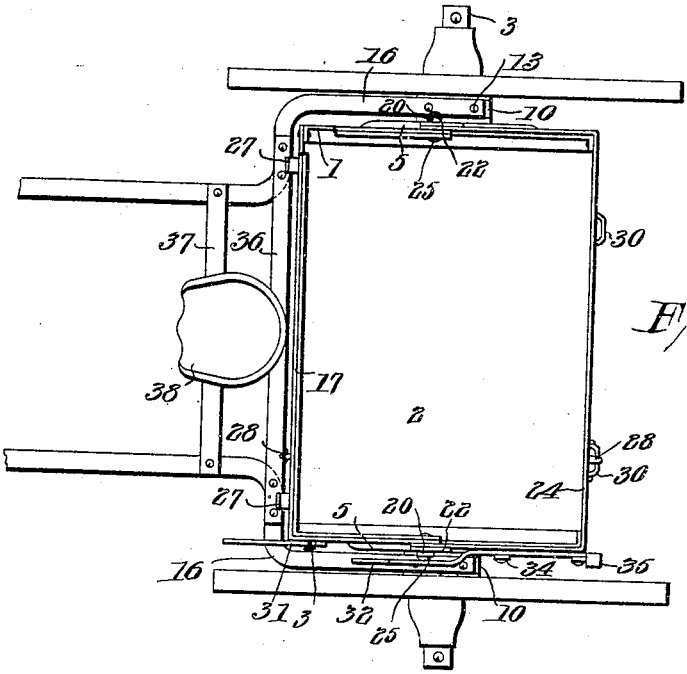
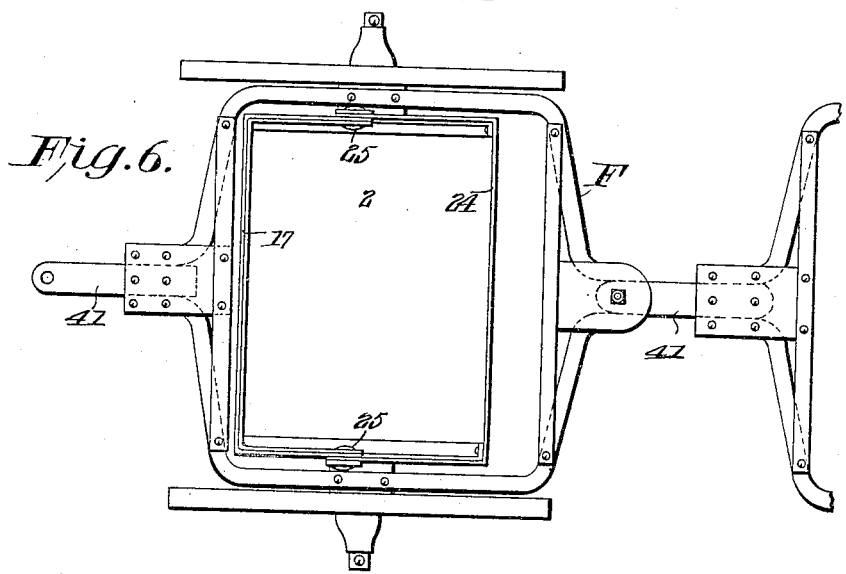
Witnesses
Herbert S. Long, Inventor
Attorneys

UNITED STATES PATENT OFFICE.

HERBERT S. LONG, OF MARION, OHIO.

DUMPING-CART.

No. 814,059.  Specification of Letters Patent.  Patented March 6, 1906.

Application filed May 29, 1905. Serial No. 262,863.

*To all whom it may concern:*

Be it known that I, HERBERT S. LONG, a citizen of the United States, residing at Marion, in the county of Marion and State of Ohio, have invented a new and useful Dumping-Cart, of which the following is a specification.

This invention relates to that class of two-wheeled dumping-carts which are used for the transportation of such material as coal, sand, gravel, earth, and the like, the object of the invention being to present a device of this class which may be readily loaded with the materials that are to be conveyed therein, especially when such materials are very heavy or bulky, which shall be of large capacity and easy running, so that heavy loads may be readily transported, which may be easily and quickly dumped in such a manner that the entire contents may be discharged, which shall be provided with side extensions to increase the capacity of the cart, and which shall possess superior advantages in point of simplicity, durability, and general efficiency.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a side elevation showing the improved dumping-cart in normal position for transportation and with dotted lines showing the body of the cart in discharging position, the near wheel being removed. Fig. 2 is a side elevation showing the cart in loading position, the near wheel being removed. Fig. 3 is a sectional detail view taken through one side of the cart and through the axle-casting and related parts. Fig. 4 is a perspective detail view of the draft-ring coöperating with the axle-casting. Fig. 5 is a top plan view showing the cart in normal position for transportation. Fig. 6 is a top plan view illustrating a modification whereby the cart is adapted to be arranged as a unit of a train or series. Fig. 7 is a side view of the draft-frame used in connection with the cart as shown in Fig. 6. Fig. 8 is a detail front view of the upper portion of the cart-body.

Corresponding parts in the several figures are indicated throughout by similar characters of reference.

The body C of the improved cart is preferably constructed of sheet iron or steel of suitable gage and is approximately semicylindrical or semi-elliptical in shape.

Upon the ends of the cart-body, which are designated 1 1 and preferably in a position approximately concentric with the bottom 2, are mounted stub-axles 3, which are provided with base-plates 4, having arms 5 5 provided with suitable apertures for the passage of fastening means, such as bolts or rivets 6, whereby the said base-plates are very securely connected with the sides of the cart, which are thereby materially braced and reinforced, while the connection is one of great stability.

Each base-plate, with its radiating arms and stub-axle, preferably consists of a single casting, and the axle stub or spindle 3 may be provided with a longitudinal bore 7, which without detracting from the strength reduces the weight. The base-plates 4 are provided with annular flanges 8, surrounding and concentric with the spindles 3, and said flanges are provided with annular grooves 9 for the reception of the members, which may be called the "draft-rings" D. Said draft-rings each is composed of two semicircular members 10 10, hingedly connected with each other at their lower edges, as shown at 11, and provided at their upper edges with reinforcements coöperating to form a bracket 12, having apertures 13, and provided at its outer edge with a flange 14. The brackets 12 are also provided with inwardly-extending overhanging flanges 15, which when said draft-rings are in position in the grooves 9 of the flanges 8 of the base-plates 4 will overhang the inner portions of said flanges, while the brackets 12 are for the support of the thills 16 or other draft members which are connected therewith by means of bolts or fastening devices passing through the apertures 13. When the draft-rings are thus connected with the draft members, they are thereby secured in position to rotate upon the flanges 8. The flanges 14 of the supporting-brackets 12 abutting upon the thills or other draft members will prevent the fastening means from shearing off by the pressure exerted in turning the cart.

The cart-body is provided with extension members for the purpose of increasing the capacity thereof, said extension members being connected with the cart-body to extend upwardly from the front and rear sides and the ends thereof. These extensions member are preferably constructed of plates or strips of sheet metal of suitable dimensions bent to approximate U shape connected with the cart. The front extension member 17 is connected with the front side and with the ends of the cart-body by means of straps 18 and bolts or rivets 19, whereby a permanent connection is effected. Upon the ends of the cart-body are secured upwardly-extending straps or brackets 20, provided at their upper ends with offsets 21 for the reception of washers 22, whereby an extended bearing-surface is formed. The side members 23 of the rear extension member 24 are connected pivotally with the brackets 20 by means of pins or bolts 25, which also extend through the sides of the front extension member 17, which latter is thereby retained permanently in position with additional security. The side members 23 are provided with cut-off corners 26 to enable the rear extension member 24 to turn upon the pivots 25, the front ends of the side members of the rear extension member overlapping the rear ends of the side members of the front extension member, as will be seen. The rear extension member is also made of sufficiently larger dimensions than the front extension member to enable it to be swung over the latter to the position shown in Fig. 2 of the drawings, where it has been shown as being temporarily supported upon hooks or shoulders 27 at the upper front edge of the cart-body. The latter is also provided adjacent to said supporting-hooks with a short length of chain 28, adapted to engage a hook 29 upon the extension member 24, which latter may thus be secured in the position illustrated in Fig. 2. The extension member 24 is provided with handles 30, whereby it may be conveniently manipulated, said handles being located at what is normally the lower rear edge of said extension member. The ends of the cart-body are provided with clips or brackets 30', whereby the rear extension member may be sustained in its normal position upon the upper edge of the cart-body.

For tilting the cart-body the latter is provided at one end, near the front side, with a permanently-secured handle or lever 31. An additional tilting-lever 32 is pivotally connected with the end of the cart-body near the rear side of the latter, as shown at 33, and said lever may when not in use be supported in an out-of-the-way position in a clip or keeper 34. When said tilting-lever is to be used, it is raised to the position indicated in dotted lines in Fig. 2, when it is adapted to abut upon a flange 35, against which it will press while the lever is manipulated to tilt the cart-body.

When thills are used in connection with the improved cart, said thills are to be connected in the usual manner by means of cross-bars, as 36 37, which serve to afford supporting means for a seat 38. Connected with the cross-bar 36 is a chain 39, one of the links of which may be placed in engagement with a hook 40 upon the cart-body for the purpose of supporting the latter in the partly-tilted position shown in Fig. 2 to facilitate the loading of the same by lowering the rear edge, so that it will not be necessary to greatly elevate the material which is to be loaded. The loading of course is also greatly facilitated, especially in the preliminary stage, by folding the rear extension member into the position shown in Fig. 2.

The improved cart may readily be used with a double team by substituting a tongue for the thills 17, the tongue being connected by hound members with the draft-rings D. In Fig. 6 the improved cart has been shown in connection with the draft-frame F of approximately rectangular shape, the side members of said frame being connected with the draft-rings, as will be readily understood. Said draft-frame is provided at its front and rear ends with coupling means, such as links 41, which may be connected therewith in any suitable and convenient manner to enable any desired number of carts to be coupled or connected together in train or series to be propelled by a traction-engine or other suitable means. The draft-frame may be readily applied to the cart without changing the construction of the latter in any respect, as will be readily seen, and the cart is thus adapted to be successfully used in railway and other excavating work of large proportions.

From the foregoing description, taken in connection with the drawings hereto annexed, the operation and advantages of this invention will be readily understood by those skilled in the art to which it appertains.

A vehicle of this description of large capacity may be constructed at a comparatively small expense, and the center of gravity of the cart-body or tank may be readily maintained at different angles, thus insuring facility in loading and transportation as well as in discharging the load.

While the device is being transported, the tank or cart-body may be locked by properly adjusting the chain 39 in connection with the hook 40.

When the device is being tilted, the flanges of the spindle-bearing plates 4 rotate within the draft-rings D, thus relieving the spindles and axle-boxes of weight and wear. The flanges 8 by extending over the inner ends of the hubs will serve largely to prevent the admission of dirt into the latter.

The general construction and operation of the device is simple and efficient for the purposes for which it is intended.

Having thus described the invention, what is claimed is—

1. A tilting cart-body, spindle-bearing plates upon the ends of the same and having annular flanges, and draft-rings supported for rotation by said flanges.

2. A tilting cart-body, spindle-bearing plates upon the ends of the same and having annular grooved flanges, and draft-rings supported for rotation by said grooved flanges.

3. A tilting cart-body, spindle-bearing plates upon the ends of the same said plates being provided with reinforcing-arms connected with the cart-body and with grooved flanges concentric with the spindles, and draft-rings supported for rotation by said flanges.

4. A tiltable cart-body having spindles and grooved flanges surrounding the same, in combination with draft-rings supported for rotation by said grooved flanges, and draft members connected with said rings.

5. A tiltable cart-body having spindles and grooved flanges surrounding the same, draft-rings engaging said grooved flanges and having flanged supporting-brackets, and draft members supported upon and connected with said brackets.

6. A tiltable cart-body having spindles and grooved flanges surrounding the same, draft-rings engaging said grooved flanges, said rings comprising hingedly-connected members, and draft members connected with the free ends of said draft-rings and thereby securing the latter in position upon the grooved flanges.

7. A tiltable cart-body having concentric spindles and flanges, rings engaging said flanges for rotation said rings comprising hingedly-connected members having reinforcements combining to form flanged shoulders, and draft members supported upon and connected with said flanged shoulders and thereby connecting the free ends of the hinge members constituting the rings.

8. A sheet-metal cart-body of approximately semicylindrical shape, spindle-bearing plates having divergent arms secured upon the ends of said body, draft-rings connected for rotation with said plates, and draft members connected with said rings.

9. A tiltable cart-body, a forward extension member supported permanently upon the front side and the forward portions of the ends of said body, and a rear extension member normally supported upon the rear side and the rear portions of the ends of said body and connected pivotally with the side members of the front extension member.

10. In a tiltable cart-body, a permanently-supported front extension member having sides connected with the ends of the cart-body, a rear extension member connected pivotally with the front extension member and foldable over the latter, and means for supporting said rear extension member when thus folded.

11. A tiltable cart-body having a permanently-supported front extension, side brackets, and a rear extension member pivotally connected with said brackets and with the front extension member and foldable over the latter.

12. A tiltable cart-body, a front extension member supported permanently upon the same, upward-extending brackets connected with the ends of the cart-body, a rear extension member connected pivotally with said brackets and with the front extension member and foldable over the latter, means for retaining said rear extension member against displacement when in normal position upon the rear part of the cart-body, and means for supporting said rear extension member in a forwardly-folded position.

13. A tiltable cart-body, a front extension member supported permanently upon the same, a rear extension member connected pivotally with and foldable over the front extension member, means for supporting the rear extension member in its forwardly-folded position, and means for temporarily securing said member in said position.

14. A tiltable cart-body, a rear extension member connected pivotally therewith, means for tilting said cart-body, and means for retaining it in a tilted position while being loaded.

15. A tiltable cart-body, a front extension member permanently supported upon the same, a rear extension member connected pivotally with and foldable over the front extension member, means for supporting the rear extension member in its forwardly-folded position, means for temporarily securing said member in said position, lever means for tilting the cart-body, draft means connected with the latter, and means for securing the cart-body in tilted position at various adjustments with relation to the draft means.

In testimony that I claim the foregoing as my own I have hereto affixed my signature in the presence of two witnesses.

HERBERT S. LONG.

Witnesses:
RAY W. SIMPSON,
H. N. QUIGLEY.